United States Patent
Mariager

(10) Patent No.: US 11,913,816 B2
(45) Date of Patent: Feb. 27, 2024

(54) MAGNETIC-INDUCTIVE FLOW METER AND MEASURING POINT

(71) Applicant: Endress+Hauser Flowtec AG, Reinach (CH)

(72) Inventor: Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 402 days.

(21) Appl. No.: 17/414,396

(22) PCT Filed: Nov. 13, 2019

(86) PCT No.: PCT/EP2019/081219
§ 371 (c)(1),
(2) Date: Jun. 16, 2021

(87) PCT Pub. No.: WO2020/126241
PCT Pub. Date: Jun. 25, 2020

(65) Prior Publication Data
US 2022/0057241 A1    Feb. 24, 2022

(30) Foreign Application Priority Data
Dec. 19, 2018 (DE) .................. 10 2018 132 935.0

(51) Int. Cl.
   G01F 1/58    (2006.01)
(52) U.S. Cl.
   CPC .................. G01F 1/588 (2013.01)
(58) Field of Classification Search
   None
   See application file for complete search history.

(56) References Cited

U.S. PATENT DOCUMENTS

| 5,301,556 | A | 4/1994 | Nissen et al. |
| 10,429,220 | B2 * | 10/2019 | Rupp ............ G01F 1/588 |
| 2006/0144160 | A1 | 7/2006 | Ketelsen |

(Continued)

FOREIGN PATENT DOCUMENTS

| CN | 1164023 A | 11/1997 |
| CN | 101294832 A | 10/2008 |
| CN | 101907471 A | 12/2010 |

(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetic-inductive flow meter for measuring flow velocity or volume flow rate of a medium includes: a measuring tube having a first cross-section and a middle segment, which has a second cross-section, between inlet side and outlet side end planes, wherein the first cross-sectional area is greater than the second cross-sectional area; a pole shoe or a saddle coil, which subtends the measuring tube with a maximum central angle; and an electrode system having two electrode pairs, wherein a central angle in the second cross-section defines a minimum circular sector in which the electrodes located on a side of the measuring tube are distributed, wherein the electrode pairs are arranged in the middle segment such that the central angle and the maximum central angle are adapted relative to one another such that the flow meter is insensitive to departures from a rotationally symmetric flow.

19 Claims, 5 Drawing Sheets

(56) References Cited

U.S. PATENT DOCUMENTS

2018/0266859 A1  9/2018  Bos

FOREIGN PATENT DOCUMENTS

| CN | 106574858 A | 4/2017 |
|---|---|---|
| DE | 102011079351 A1 | 1/2013 |
| DE | 102011079352 A1 | 1/2013 |
| DE | 102014113408 A1 | 3/2016 |
| DE | 102014119451 A1 | 6/2016 |
| DE | 102015113390 A1 | 3/2017 |
| EP | 0878694 A1 | 11/1998 |
| EP | 3184969 A1 | 6/2017 |
| GB | 2342167 A | 4/2000 |
| JP | 08247812 A | 9/1996 |
| RU | 101817 U1 | 1/2011 |
| WO | 2004031699 A2 | 4/2004 |
| WO | 2017025314 A1 | 2/2017 |

\* cited by examiner (PRIOR ART)

MAGNETIC-INDUCTIVE FLOW METER AND MEASURING POINT

CROSS-REFERENCE TO RELATED APPLICATIONS

The present application is related to and claims the priority benefit of German Patent Application No. 10 2018 132 935.0, filed on Dec. 19, 2018, and International Patent Application No. PCT/EP2019/081219, filed on Nov. 13, 2019, the entire contents of which are incorporated herein by reference.

TECHNICAL FIELD

The present disclosure relates to magnetic-inductive flow meters, particularly to electrode arrangements in magnetic-inductive flow meters for measuring properties of rotationally unsymmetric flow profiles.

BACKGROUND

Magnetic-inductive flow meters are applied for determining flow velocity and/or volume flow rate of a medium in a measuring tube. A magnetic-inductive flow meter includes a magnetic field producing means, which produces a magnetic field perpendicularly to the breadth axis of the measuring tube. For such purpose, usually one or more coils are used. In order to implement a predominantly uniform magnetic field, supplementally, saddle coils or pole shoes are so formed and placed such that the magnetic field lines extend over the total tube cross-section essentially perpendicular to the transverse axis. A measuring electrode pair situated at the wall of the measuring tube senses an inductively produced electrical measurement voltage, which arises, when a conductive medium flows in the direction of the longitudinal axis in the presence of a magnetic field. Since the registered measurement voltage depends according to Faraday's law of induction on the velocity of the flowing medium, flow velocity and, with incorporation of a known tube cross-sectional area, volume flow rate of the medium can be ascertained from the measurement voltage.

Magnetic-inductive flowmeters are sensitive to the flow profile of the flowing medium. Depending on pipe system and measurement device, measurement errors of a number of percent can occur. Usually, consequently, a straight pipe, whose length is at least 5 to 10 times the nominal diameter of the measuring tube, is installed at the inlet end. There are, however, applications known, in which this minimum distance, the so-called inlet path, cannot be used. This is, for example, the case, when a pipe system is located in tight quarters.

The sensitivity of the flow measurement to a rotationally unsymmetric flow profile depends on the geometry of the measuring tube, the magnet system and the electrodes. Therefore, the influences of the pipe and electrode geometry must be taken into consideration for the correct characterization of the velocity dependent induction voltage. The two influences are described mathematically by a weighting function GF.

The influence of the geometry on the flow can best be illustrated by the following relationship:

$$U(x) = \int_V v(x')GF(x', x)dV$$

wherein, for determining the voltage U(x), flow velocity v(x') and the weighting function GF(x',x) are integrated over the volume of the measuring tube. In such case, the weighting function GF enters based on GF (x',x) =B×∇G(X', X), with the magnetic field B (x') and a Green's function G, which is provided by the electrical boundary conditions. The goal of an optimizing method is to optimize the geometry of the construction such that ∇×GF=0 in the total flow profile. Such is, however, not possible for a tube with a single point shaped electrode pair. The use of additional electrodes provides a possible approach to a solution.

Thus, known, for example, from CN 101294832 A is a magnetic-inductive flow meter, which has two electrode pairs, which are arranged axisymmetrically in a tube cross-section, in order, thus, to minimize the influence of the flow profile on the determining of volume flow rate. The two electrode axes defined by the electrode pairs form, in such case, an angle of about 40° in the cross-section of the measuring tube.

Another proposal is disclosed in DE 102015113390 A1, where second and third electrode pairs are arranged on defined electrode axes, which are arranged at an angular measure of less than or equal to ±45° relative to a first electrode axis oriented perpendicularly to the magnetic field.

EP 0878694 A1 likewise discloses a magnetic-inductive flow meter, which, starting from the state of the art, has two additional electrode pairs, whose electrode axes form, in each case, an angle of about 45° relative to the electrode axis of the conventional electrode pair, in order to achieve an improvement of the accuracy of measurement in the range of measurement errors less than 1%. Such is especially achieved by individually registering and weighting the potential differences between the electrodes.

Disadvantageous with these proposals is that for each electrode pair a weighting factor must be taken into consideration, wherein it is not a priori clear how these are to be selected as a function of the pipe system, or the rotationally unsymmetric flow profile.

SUMMARY

Starting from the above state of the art, an object of the present invention is to provide a magnetic-inductive flow meter, which minimizes the influences of a rotationally unsymmetric flow profile in the determining of flow velocity and volume flow rate.

The object is achieved by the magnetic-inductive flow meters and by the measuring point according to the present disclosure.

The magnetic-inductive flow meter of the invention for measuring flow velocity u or volume flow rate V̇ of a medium includes a measuring tube having a first cross-section and serving for conveying the medium in a longitudinal direction defined by a measuring tube axis, wherein the measuring tube has an inlet side end plane and an outlet side end plane, which bound the measuring tube in the longitudinal direction, wherein the measuring tube has between inlet side and outlet side end planes a middle segment, which has a second cross-section, wherein the first cross-sectional area is greater than the second cross-sectional area, wherein a vertical longitudinal plane divides the measuring tube into a first side and a second side, wherein the measuring tube includes a fluid conveying passageway, which has a wall bounded by a liner, at least one magnetic field producing means for producing in the medium a magnetic field extending essentially perpendicularly to the longitudinal direction, wherein the magnetic field producing means has a pole shoe, wherein the pole shoe in the second cross-section of the measuring tube subtends the fluid conveying passageway with a maximum central angle β, and an electrode system having at least two electrode pairs, which are adapted to register a voltage induced perpendicularly to the magnetic field and to the longitudinal direction between the electrode pairs, wherein a first electrode of each electrode pair is located on the first side of the measuring tube, wherein a second electrode of each electrode pair is located on the second side of the measuring tube, wherein a central angle a in the second cross-section of the measuring tube defines a minimum circular sector, in which, in each case, the electrodes located on a side of the measuring tube are distributed, wherein the electrode pairs are arranged in the middle segment, and is characterized in that the central angles α and β are so adapted relative to one another that the flow meter is to a degree insensitive to departures from a rotationally symmetric flow such that the magnetic-inductive flow meter in a test measurement has a measurement error of flow velocity $$\Delta_u = \left| \frac{u_{va} - u_S}{u_{va}} \right|$$

and/or a measurement error of volume flow rate $$\Delta_{\dot V} = \left| \frac{\dot V_{va} - \dot V_S}{\dot V_{va}} \right|$$

of less than 1.0%, especially less than 0.5% and preferably less than 0.2%, wherein a flow velocity $u_{va}$ and/or a volume flow rate $\dot V_{va}$ form reference values, wherein a flow velocity $u_S$ and/or a volume flow rate $\dot V_S$ are determined in the case of a rotationally unsymmetric flow.

A magnetic-inductive flowmeter, which is insensitive to a rotationally unsymmetric flow profile, is ideal for monitoring pipe systems, in the case of which an optimal inlet path, whose length is a multiple of the nominal diameter of the measuring tube, cannot be implemented.

Disturbances bring about, depending on distance and type of disturbance, measurement errors due to a non-ideal flow profile of the medium, since a magnetic-inductive flowmeter is normally optimized such that a fully developed, rotation symmetric flow profile is present. A fully developed, rotation symmetric flow profile is one, in which the flow profile no longer changes in the flow direction. Such a flow profile forms, for example, in a measuring tube having an inlet path length 30 times measuring tube nominal diameter and a medium velocity of 2 m/s.

Known in the state of the art are magnetic-inductive, flow meters having at least two electrode pairs, which define an angle α in the cross-section of the measuring tube. Usually, adjoining electrodes are separated by an angle δ with fixed angular value of about 180° /(N+1), wherein the natural number N corresponds to the number of electrode pairs. With a weighting of the potential differences occurring separately on the electrodes, this provides measurement errors of less than 1% for rotationally unsymmetric flow profiles. It has surprisingly been found that the occurring measurement error due to a rotationally unsymmetric flow profile can be significantly reduced further by modifying the angles α and β.

The central angle β serves, in such case, as characteristic variable for the magnetic field producing means and gives the extent of the measuring tube cross-sectionally surrounded by the pole shoe. While a small central angle β provides that the magnetic field lines are concentrated exclusively in the center of the measuring tube, the use of a large central angle β spreads the magnetic field uniformly approximately over the entire cross-section of the measuring tube. The central angle β is, in such case, characterized by two lines, which meet in the center of the tube and each of which intersects its one of the two ends of the pole shoe.

There are magnetic field producing means known, which include a field-guide material for the external field and have at least one shielding element between a pole shoe and the field-guide material and/or above the field-guide material and the electromagnets. These components serve for reducing disturbance or stray fields and/or to close the magnetic field line loops and are not responsible for the in-coupling of the magnetic field into the medium.

The magnetic field producing means is arranged outside of the measuring tube and is secured completely against, partially against or with a fixed distance from, the measuring tube. There are, however, also magnetic-inductive, flow meters known, which have magnetic field producing means cast into the liner, or in the wall. The electrodes, in contrast, do not have to be embedded, but rather can also be inserted subsequently as rod electrodes. However, in many cases electrodes with electrode heads, e.g., so-called mushroom head electrodes, are preferable for use in a magnetic-inductive flow meter. Such can advantageously in the context of the present invention be cast in place while forming the material of the wall during the manufacturing process.

The measuring tube is embodied to be electrically insulating on its inside contacting the medium, and, indeed, on the one hand, e.g., in such a manner that the measuring tube is composed completely of an insulating material, especially sintered ceramic, preferably aluminum oxide ceramic, or a plastic. On the other hand, the insulation can also be implemented in that a non-ferromagnetic metal tube, especially a stainless steel tube, is lined internally with an insulating layer of a suitable plastic, especially hard rubber, polyurethane, soft rubber or a polyfluoroethylene, preferably polytetrafluoroethylene.

For ascertaining the reference value, a flow meter is used, which is based on the Coriolis principle and has an accuracy of measurement of 0.1%. Such is installed in a pipe system and serves as reference system for the magnetic-inductive flow meter of the invention.

The middle segment of the measuring tube has a second cross-section, which has a lesser cross-sectional area than the first cross-section. The shape of the second cross-section can deviate from the shape of the first cross-section. The second cross-section can be circular, oval, rectangular, square or rectangular with rounded corners. The shape and size of the second cross-section depends on the thickness and shape of the wall.

Advantageous embodiments of the invention are set forth in the dependent claims.

In an embodiment of the invention, a rotationally unsymmetric flow is produced for the test measurement by a disturbance installed at the inlet side end plane and comprising at least one disturbance source.

The test measurement can also serve for determining the optimal sizes of the central angles α and β. This is performed earlier, so that, taking into consideration the central angle pair (α,β), a flow profile independent, magnetic-inductive flow meter can be implemented.

The test measurement can include many different disturbance sources, which can assume a variety of installed angles. Because of the application of sufficiently different disturbances, the central angles α and β can be optimized such that the measurement error of a particular disturbance assumes a value of less than 0.05% and the maximum measurement error of any disturbance has a value of less than 0.5%.

It has been found that by the use of two sufficiently different disturbance sources, especially a diaphragm and a 90° elbow, an effectively good central angle pair (α,β) can be ascertained for a magnetic-inductive flow meter, which for some other disturbance has a maximum measurement error of 0.5%. By taking into consideration further disturbance sources in the test measurement, the optimized parameters change only marginally, whereby the resulting measurement error changes only slightly.

In an embodiment, the disturbance source comprises a diaphragm or a 90° elbow, wherein 50% of the cross-section of the measuring tube is covered by the diaphragm, wherein the diaphragm has a chord, which limits the diaphragm toward the tube, wherein the diaphragm assumes a first diaphragm orientation or a second diaphragm orientation, wherein in the case of the first diaphragm orientation the chord is oriented perpendicularly to the magnetic field and in the case of the second diaphragm orientation the chord is oriented in parallel with the magnetic field, wherein the 90° elbow assumes a first elbow orientation or a second elbow orientation, wherein the first elbow orientation is distinguished by a pipe axis extending perpendicularly to the magnetic field and to the longitudinal direction of the measuring tube and the second elbow orientation is distinguished by a pipe axis extending in parallel with the magnetic field and perpendicularly to the longitudinal direction of the measuring tube.

Previously, a prescribed inlet path was predetermined for users of magnetic-inductive, flow meters. This prescribed inlet path was necessary to meet the measurement error levels predetermined for the device. The arising measurement error had to be ascertained once per disturbance type, separation, mounting angle and possibly Reynolds number. This was performed either by complex test series or by simulations of the flow conditions for different disturbances and evaluation of the calculated flow profiles. As a result of this step, one obtained data, which gave how large the measurement error would be, which would arise, when a magnetic-inductive flow meter was installed into the corresponding placement and how large the measurement error would be, when the central angle α of the electrode system or the central angle β of the magnetic field producing means was adapted.

In an embodiment, the disturbance is provided with separation 0-DN at the inlet side end plane (2).

In an embodiment, an insensitivity to a rotationally unsymmetric flow profile is provided at a Reynolds number of the medium in the measuring tube (1) greater than or equal to 100,000, especially greater than or equal to 50,000 and preferably greater than or equal to 10,000.

In an embodiment, the flow meter has two or three electrode pairs.

In an additional embodiment, the flow meter has two or three electrode pairs. The electrode pairs do not necessarily have to be diametrically arranged. The at least two electrode pairs are coupled galvanically or capacitively with the measured medium.

In an embodiment, at least two electrodes, especially all electrodes, located, in each case, on one side of the measuring tube relative to the vertical measuring tube longitudinal plane are connected electrically together.

The advantage of this embodiment of the invention is that it was found that by adapting the angles α and β a sampling of the individual potential differences with incorporation of empirically determined weighting factors can be omitted and the voltage over all electrodes in the case of a disturbance differs by less than 0.5% from a measured value ascertained based on a fully developed flow profile. A weighting of the individual voltage values is, thus, not necessary, whereby the evaluation unit for determining the voltage and the flow velocity resulting therefrom can be significantly simplified. It is sufficient then to convert the measured voltage value by means of a calibration into a flow velocity or a volume flow rate.

The electrodes are, especially, connected with one another by cable and preferably by a conductive piece of sheet metal. This offers a simple and stable assembly and delivers supplementally a cost-effective alternative to known solutions. The electrodes are connected with a control and evaluation unit, which based on the voltage induced in the electrodes delivers information with reference to flow velocity and volume flow rate in the measuring tube.

In an embodiment, the following holds for the central angle α: $30°\leq\alpha\leq60°$ and, especially, $40°\leq\alpha\leq50°$.

In an embodiment, the following holds for the central angle β: $50°\leq\beta\leq90°$ and, especially, $70°\leq\beta\leq80°$.

The setting of the central angles α and β is performed with a simulation program or based on a test setup.

In an embodiment, the electrodes are arranged axisymmetrically to the vertical measuring tube longitudinal plane.

In an embodiment, two neighboring electrodes located on one side of the measuring tube are spaced by a central angle $\delta=\alpha/(N-1)$ in the cross-section of the measuring tube, wherein a natural number N corresponds to the number of electrode pairs.

A measuring point of the invention for ascertaining a flow profile independent flow velocity u or volume flow rate V̇ includes a magnetic-inductive flow meter for measuring flow velocity u or volume flow rate V̇ of a medium with a measuring tube for conveying the medium in a longitudinal direction defined by a measuring tube axis, wherein the measuring tube has an inlet side end plane and an outlet side end plane, which bound the measuring tube in the longitudinal direction, wherein the measuring tube includes for conveying fluid a passageway, which has a wall bounded by a liner, with at least one magnetic field producing means for producing in the medium a magnetic field extending essentially perpendicularly to the longitudinal direction, wherein the magnetic field producing means has a pole shoe, wherein the pole shoe in a cross-section of the measuring tube or the fluid conveying passageway subtends a maximum central angle β; and with an electrode system having at least two electrode pairs, which are adapted to register a voltage induced in the medium perpendicularly to the magnetic field and to the longitudinal direction, wherein a vertical measuring tube longitudinal plane divides the measuring tube into a first side and a second side, wherein, in each case, a first electrode of an electrode pair is located on the first side of the measuring tube, wherein, in each case, a second electrode of an electrode pair is located on the second side, wherein a central angle α in the cross-section of the measuring tube defines a minimum circular sector, in which each of the electrodes located on a side of the measuring tube are distributed, and is characterized in that the central angles α and β are so adapted to one another that the flow meter is insensitive to departures from a rotationally symmetric flow because of a disturbance source applied with a separation of 0-DN at the inlet side end plane, wherein the magnetic-inductive flow meter has a measurement error of flow velocity $$\Delta_u = \left| \frac{u_{va} - u_S}{u_{va}} \right|$$

or a measurement error of volume flow rate $$\Delta_{\dot{V}} = \left| \frac{\dot{V}_{va} - \dot{V}_S}{\dot{V}_{va}} \right|$$

of less than 1.0%, especially less than 0.5% and preferably less than 0.2%, wherein a flow velocity $u_{va}$ and a volume flow rate $\dot{V}_{va}$ are determined in the case of a flow with fully developed flow profile, wherein a flow velocity $u_S$ and a volume flow rate $\dot{V}_S$ are determined with the applied disturbance source.

In an embodiment, the following holds for the central angle α: 30°≤α≤60° and, especially, 40°≤α≤50°, and the following holds for the central angle β: 50°≤β≤90° and, especially, 70°≤β≤80°.

The setting of the central angles α and β is performed with a simulation program or based on a test environment. A test environment is defined or established and the central angles of the flowmeter varied until the measurement error for the test environment is minimum.

In an embodiment, a rotationally unsymmetric flow is produced for the test measurement by a disturbance installed at the inlet side end plane and comprising at least one disturbance source.

The test measurement can also serve for coordinating the optimal central angles α and β and is then performed earlier, so that taking into consideration the optimized central angle pair α and β a flow profile independent, magnetic-inductive flowmeter can be implemented.

The test measurement can include many different disturbance sources, which all can assume any installed angles. Because of the application of sufficiently different disturbances the central angles α and β can be optimized such that the measurement error of a particular disturbance assumes a value of less than 0.05% and the maximum measurement error of any disturbance is less than 0.5%.

It has been found that by the use of two sufficiently different disturbance sources, especially a diaphragm and a 90° elbow, an effectively good central angle pair (α,β) can be ascertained for a magnetic-inductive flowmeter, so that some other disturbance leads to a maximum measurement error of 0.5%. By taking into consideration further disturbance sources in the test measurement, the optimized parameters change only marginally, whereby the resulting measurement error changes only slightly.

In an embodiment, the measuring point includes a flow meter having two or three electrode pairs.

In an embodiment, at least two electrodes, especially all electrodes, located on a side of the measuring tube with reference to the vertical measuring tube longitudinal plane are connected electrically together.

In an embodiment the electrodes are connected electrically together with a stamped-bent part.

In an embodiment, the measuring tube includes first and second cross-sections, wherein the measuring tube has between inlet side and outlet side end planes a middle segment, which has the second cross-section, wherein the electrode pairs are arranged in the middle segment.

In an embodiment, the disturbance source comprises a 90° elbow with any elbow orientation and/or a diaphragm with any diaphragm orientation and/or a valve and/or a pump and/or a T piece and/or a double arch of two 90° elbows set one after the other.

BRIEF DESCRIPTION OF THE DRAWINGS

The invention will now be explained in greater detail based on the appended drawing, the figures of which show as follows.

DETAILED DESCRIPTION

Figure 1:
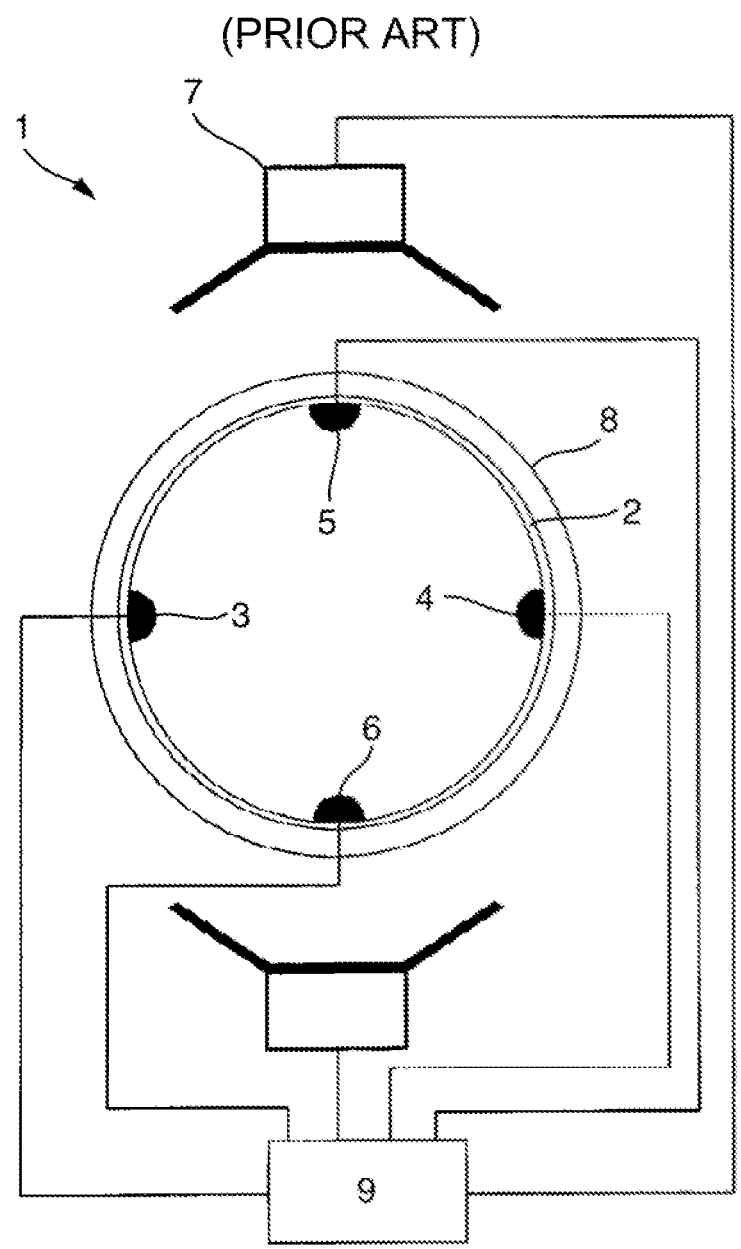
FIG. 1 shows a schematic view of the cross-section of a magnetic-inductive flow meter according to the state of the art.

FIG. 1 shows a magnetic-inductive flowmeter known in the state of the art. The construction and the measuring principle of a magnetic-inductive flowmeter are basically known. An electrically conductive medium is led through the measuring tube (1). A magnetic field producing means (7) is arranged such that the magnetic field lines extend perpendicularly to a longitudinal direction defined by the measuring tube axis (13). Suited as magnetic field producing means (7) is preferably a saddle coil or a pole shoe with superimposed coil and coil core. In the case of applied magnetic field, there arises in the measuring tube (1) a flow dependent potential distribution, which is sensed with two electrodes (3, 4) applied at the inner surface of the measuring tube (1). As a rule, these are arranged diametrically opposite one another and form an electrode axis, which extends perpendicularly to the magnetic field lines and to the longitudinal axis of the tube. Based on the measured voltage and taking into consideration the magnetic flux density, flow velocity can be determined and further taking into consideration the tube cross-sectional area, volume flow of the medium can be determined. In order to avoid the shorting of the measurement voltage on the electrodes (3, 4) through the tube (8), the inner surface is lined with an insulating material, for example, in the form of a plastic liner (2).

The magnetic field formed by a magnetic field producing means, for example, an electromagnet, is produced by a direct current of alternating polarity clocked by means of an operating unit (9). This assures a stable zero-point and makes the measuring insensitive to influences of electrochemical disturbances. A measuring unit (9), which may include the operating unit (9), as shown in FIG. 1, reads out the voltage on the electrodes (3, 4) and outputs flow velocity and/or volume flow of the medium calculated by means of an evaluation unit. Usual magnetic-inductive flowmeters have supplementally to the electrodes (3, 4) two other electrodes (5, 6). On the one hand, a fill level monitoring electrode (5) mounted optimally at the highest point in the tube (8) serves to detect a partial filling of the measuring tube (1), to forward this information to the user and/or the fill level is taken into consideration for the ascertaining of volume flow. Furthermore, a reference electrode (6), which is usually mounted diametrically opposite the fill level monitoring electrode (5), serves to assure an effective grounding of the medium.

Figure 2:
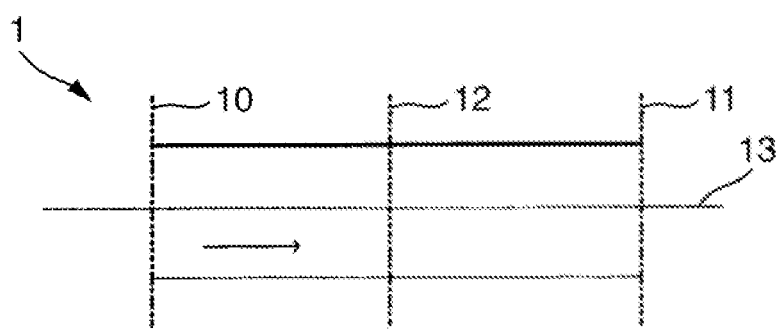
FIG. 2 shows a schematic view of the longitudinal section of a magnetic-inductive flow meter.

A magnetic-inductive flowmeter includes an inlet side end plane (10) and an outlet side end plane (11). The arrow in FIG. 2 indicates the flow direction of the medium. A 90° elbow (90° R) or a diaphragm (B) applied at the inlet side end plane (10) acts on the flow profile of the medium, such that a rotationally unsymmetric flow profile forms in the cross-section (12) of the measuring tube (1).

Figure 3:
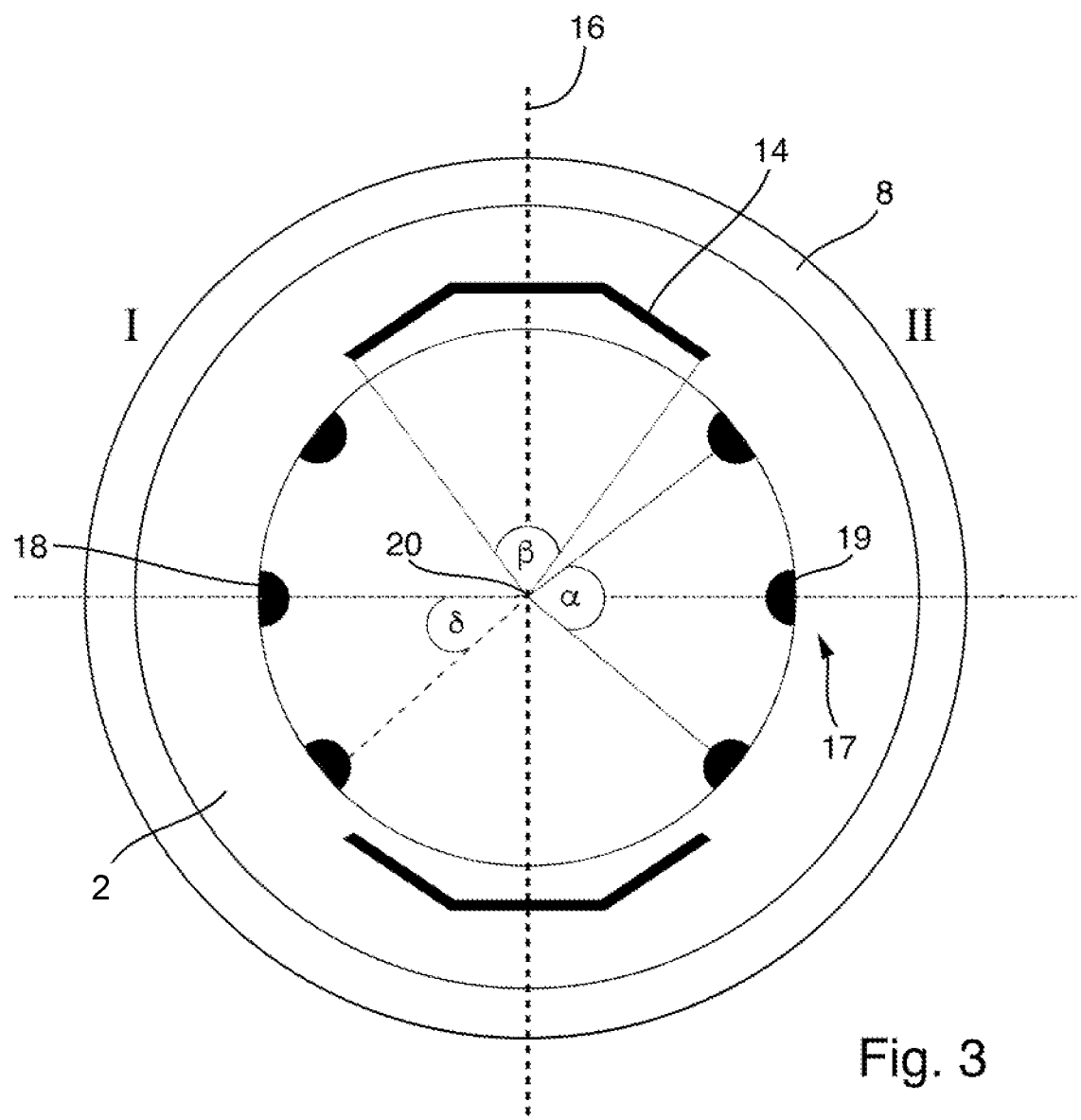
FIG. 3 shows a schematic view of the cross-section of a magnetic-inductive flow meter of the present disclosure.

FIG. 3 shows a cross-section of a middle segment of the magnetic-inductive flow meter of the invention. A magnetic field producing means, e.g., the magnetic field producing means (7) or FIG. 1 is placed such that the magnetic field lines extend perpendicularly to a longitudinal direction defined by the measuring tube axis (13). Suited as magnetic field producing means is preferably a saddle coil or a pole shoe (14) with superimposed coil and coil core. In the presence of an applied magnetic field, there arises in the measuring tube (1) a flow dependent potential distribution, which is tapped with an electrode system (17). In FIG. 3, the electrode system (17) includes three electrodes placed on a first side (I) and three electrodes placed on a second side (II) relative to a vertical longitudinal plane (16) through the measuring tube. A first electrode (18) of the first side (I) and a second electrode (19) of the second end (II) form an electrode pair. Based on the measured voltage and taking into consideration the magnetic flux density, flow velocity and, taking into consideration the tube cross-sectional area, volume flow rate of the medium can be determined. In order to avoid the shorting of the measurement voltage on the electrodes through the tube (8), the inner surface is lined with an insulating material, for example, in the form of a plastic liner (2). The magnetic field produced by a magnetic field producing means, for example, an electromagnet, is a direct current of alternating polarity clocked by means of an operating unit. This assures a stable zero-point and makes the measuring insensitive to influences of electrochemical disturbances. A measuring unit takes the voltage across the electrode system (17) and outputs on a display unit flow velocity and/or volume flow rate of the medium calculated by means of an evaluation unit.

Figure 4:
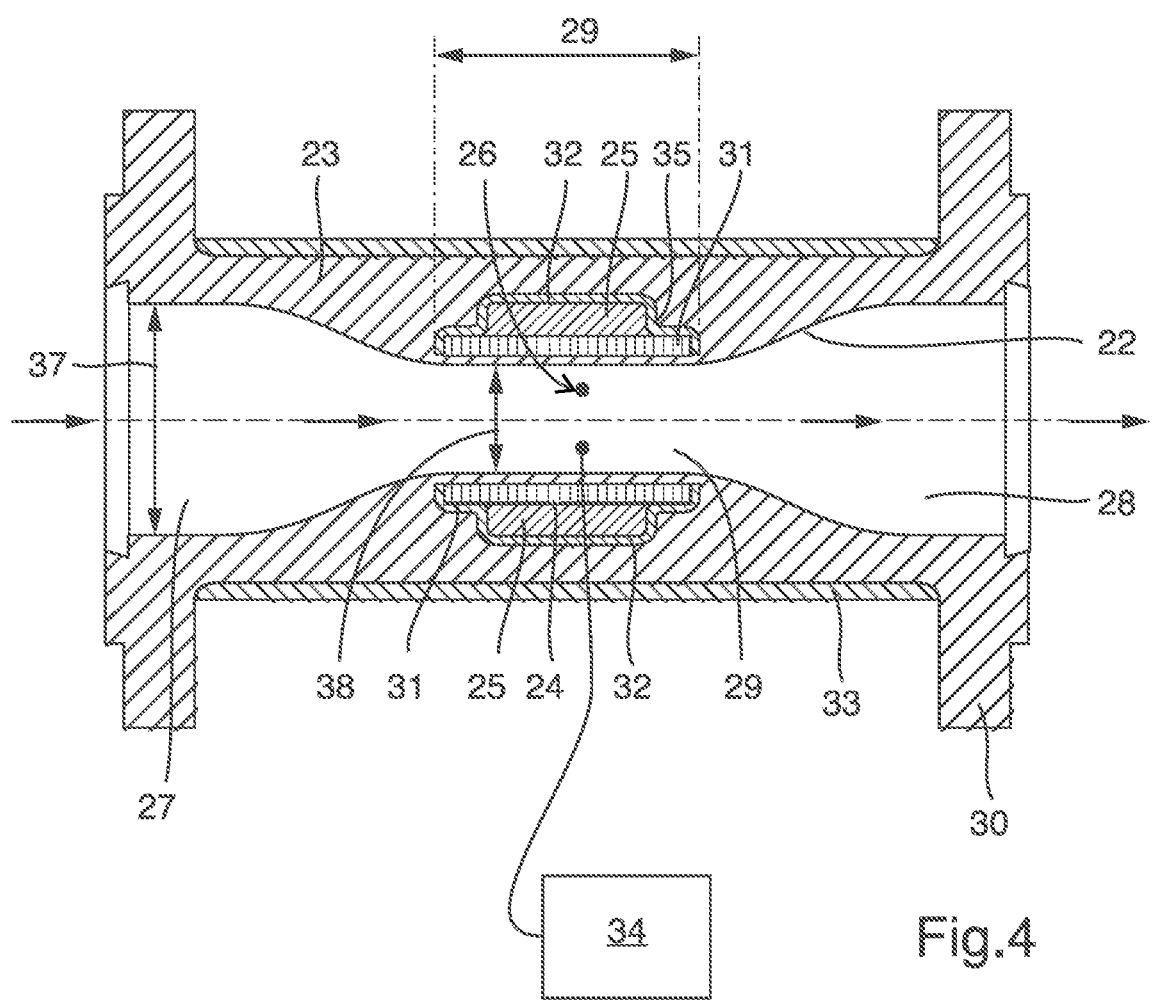
FIG. 4 shows a schematic view of the longitudinal section of a magnetic-inductive flow meter of the present disclosure.

The longitudinal section of a magnetic-inductive flow meter of the invention is shown in FIG. 4. The flow meter includes a fluid conveying passageway (22) of constricted diameter, wherein the fluid conveying passageway (22) has inlet and outlet regions (27, 28) having a first cross-section (37) and wherein the fluid conveying passageway (22) has a middle segment (29), which is located between the inlet and outlet regions (27, 28) and which has a second cross-section (38), wherein in the middle segment (29) of the fluid conveying passageway (22) an electrode system (26) is present, composed, in each case, of two electrodes arranged on opposing sides of the measuring tube. FIG. 4 shows a measurement system (24) of known form. It includes, among other things, two magnet coils (25) for producing a magnetic field. These lie diametrically opposite one another on the passageway (22). Furthermore, the measurement system includes an electrode system (26) composed of four electrodes for the tapping the voltage induced by the magnet system. The passageway (22) is bounded by a wall (23). The electrodes of the electrode system (26) are connected with a control and evaluation unit (34), which based on the voltage induced in the electrodes delivers information with reference to flow velocity and volume flow rate in the measuring tube (1). Special about the construction of FIG. 4 is that the wall (23) is simultaneously also the seating material for the measurement system (24), thus, for the magnetic field producing means and for the electrode system (26). The measurement system (24) and the magnetic field producing means can, however, also be arranged outside of the tube. Especially, the passageway forming wall (23) is formed of a cast material. The passageway forming wall (23) can supplementally to the liner (2) be introduced into, or applied against, the measuring tube (1) or comprise the liner (2).

Figure 5:
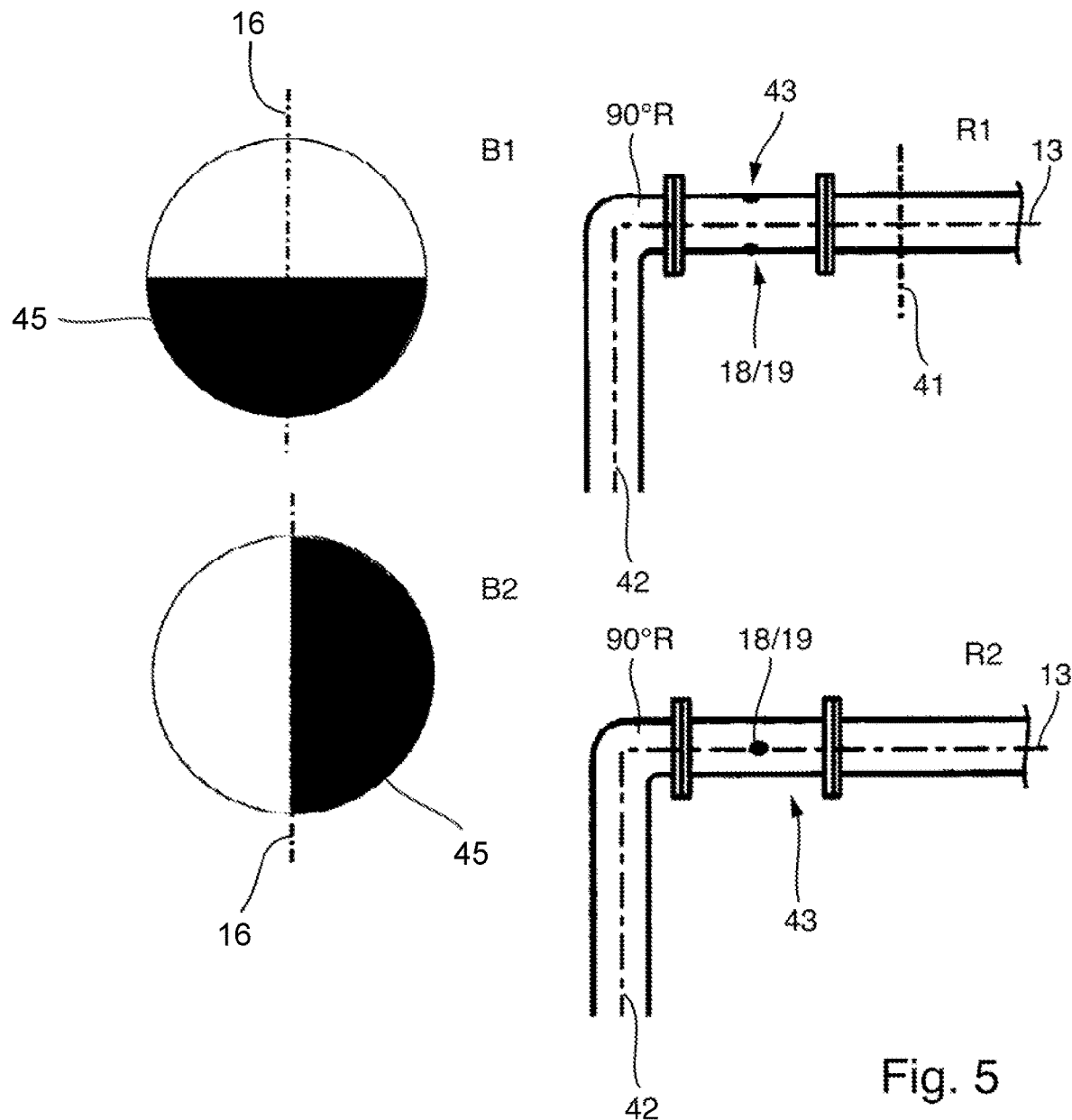
FIG. 5 shows a schematic view of different disturbance sources and measuring points with disturbance sources.

In the first step, the central angles $\alpha$ and $\beta$ are so adapted that the measurement error of flow velocity in test measurements with a single disturbance is minimum. In such case, the disturbance is generated by a diaphragm (45) or a 90° elbow (90° R) (see FIG. 5). The diaphragm (45) covers, in such case, 50% of the tube cross-section (12) and has a chord, which bounds the diaphragm (45) toward the tube. The diaphragm (45) assumes a first diaphragm orientation (B1) or a second diaphragm orientation (B2), which especially are rotated by 90° relative to one another. In such case, the chord in the case of the first diaphragm orientation (B1) is perpendicular to the magnetic field and to the vertical longitudinal plane (16) and, in the case of the second diaphragm orientation (B2), in parallel with the magnetic field and with the vertical longitudinal plane (16). The first diaphragm orientation (B1) and the second diaphragm orientation (B2) of a diaphragm (45) are shown schematically in FIG. 5. The black-filled circular segment represents, in such case, the area, which blocks a part of the cross-sectional area of the measuring tube. In the test measurement, the diaphragm (B) is placed at a distance of 0-DN from the inlet side end plane (10). Alternatively, a 90° elbow (90° R) is placed at the entrance to the inlet side end plane (10) at a distance of 0-DN, wherein the 90° elbow (90° R) assumes a first elbow orientation (R1) or a second elbow orientation (R2), which especially are rotated by 90° relative to one another. The first elbow orientation (R1) and the second elbow orientation (R2) of a 90° elbow (90° R) are schematically shown in FIG. 5. In the case of the first elbow orientation (R1), the tube axis (42) extends in parallel with the abscissa axis (41) of the flow meter (43). The selecting of the central angles $\alpha$ and $\beta$ is preferably performed for both disturbances in both orientations.

In the second step, that central angle pair is determined, whose maximum measurement error for all performed test measurements is minimum.

Figure 6:
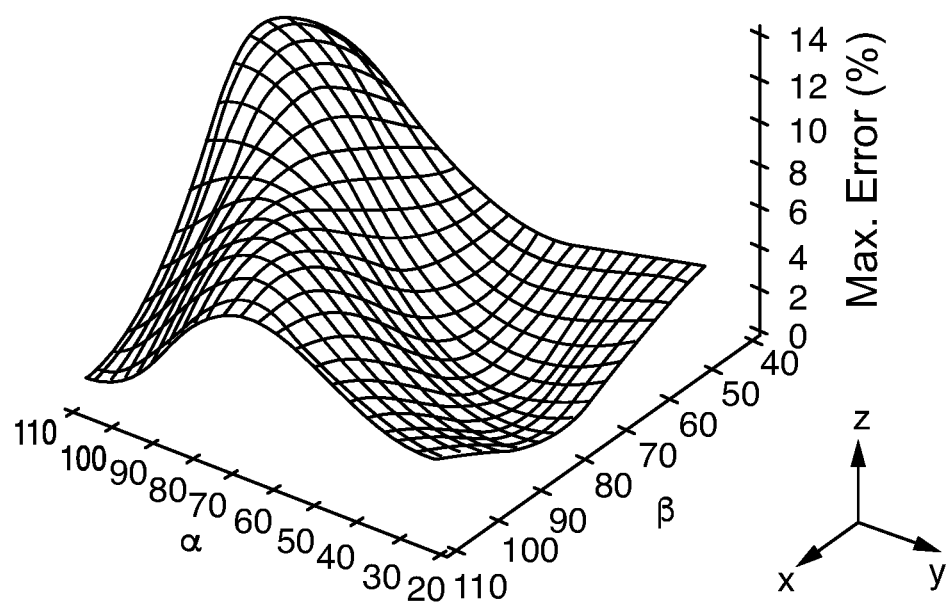
FIG. 6 shows a graph of measurement error as a function of central angles α and β for a 50-DN measuring tube.

FIG. 6 shows, by way of example, simulated measurement error (Z axis) for a 50-DN middle segment as a function of the central angle $\alpha$ (Y axis) and the central angle $\beta$ (X axis). Based on this, the minimum measurement error for a specific disturbance, in this case, an elbow (90° R) optimized as regards first and second elbow orientations (R1, R2), is ascertained. In such case, the first elbow orientation (R1) is distinguished by a measuring tube axis (13) extending perpendicularly to the magnetic field and to the longitudinal direction and the second elbow orientation (R2) by a measuring tube axis (13) extending in parallel with the magnetic field and perpendicularly to the longitudinal direction (see FIG. 5). This procedure is repeated for all above mentioned disturbances, wherein, in the last step, that central angle pair is ascertained, which has the smallest measurement error with reference to all test measurements. The desired accuracy can only be achieved for certain combinations of the central angles $\alpha$ and $\beta$. The mere optimizing of the electrode distribution or the mere adapting of the pole shoes leads, thus, not to reducing the flow profile dependence, or the measurement error. The values for the central angles α and β are varied until the resulting measurement error for all test measurements is less than 0.5%, preferably less than 0.2%.

Based on the above described optimizing method, a magnetic-inductive flow meter with three electrode pairs, a 50-DN middle segment and a medium having a flow velocity of 1 m/s has a measurement error of 0.05% in the case of an installed diaphragm (B) with diaphragm orientation (B1) and a measurement error of 0.05% in the case of an installed diaphragm (B) with diaphragm orientation (B2).

Based on the above described optimizing method, a magnetic-inductive flow meter with three electrode pairs, a 50-DN middle segment and a medium having a flow velocity of 1 m/s has a measurement error of 0.05% in the case of a 90° elbow (90° R) installed with elbow orientation (R1) and a measurement error of 0.5% in the case of a 90° elbow (90° E) installed with elbow orientation (R2).

Based on the above described optimizing method, a magnetic-inductive flow meter with three electrode pairs, a 300-DN middle segment and a medium having a flow velocity of 1 m/s has a measurement error of 0.1% in the case of a diaphragm (B) installed with diaphragm orientation (B1) and a measurement error of 0.1% in the case of a diaphragm (B) installed with diaphragm orientation (B2).

Based on the above described optimizing method, a magnetic-inductive flow meter with three electrode pairs, a 300-DN middle segment and a medium having a flow velocity of 1 m/s has a measurement error of 0.1% in the case of a 90° elbow (90° R) installed with elbow orientation (R1) and a measurement error of 0.1% in the case of a 90° elbow (90° R) installed with elbow orientation (R2).

Based on the above described optimizing method, a magnetic-inductive flow meter with three electrode pairs, a 500-DN middle segment and a medium having a flow velocity of 1 m/s has a measurement error of 0.1% in the case of a diaphragm (B) installed with diaphragm orientation (B1) and a measurement error of 0.1% in the case of a diaphragm (B) installed with diaphragm orientation (B2).

Based on the above described optimizing method, a magnetic-inductive flow meter with three electrode pairs, a 500-DN middle segment and a medium having a flow velocity of 1 m/s has a measurement error of 0.1% in the case of a 90° elbow (90° R) installed with elbow orientation (R1) and a measurement error of 0.1% in the case of a 90° elbow (90° R) installed with elbow orientation (R2).

In all of the above simulations, the DN data is for the nominal diameter, or the inner diameter, of the fluid conveying passageway in the region of the middle segment.

The invention claimed is:

1. A magnetic-inductive flow meter for measuring flow velocity or volume flow rate of a medium, the flow meter comprising:
a measuring tube having a first cross-sectional area and configured to convey the medium in a longitudinal direction defined by a measuring tube axis, wherein:
the measuring tube has an inlet side end plane and an outlet side end plane, which bound the measuring tube in the longitudinal direction;
the measuring tube includes between inlet side and outlet side end planes a middle segment, which has a second cross-sectional area, wherein the first cross-sectional area is greater than the second cross-sectional area;
a vertical measuring tube longitudinal plane divides the measuring tube into a first side and a second side; and the measuring tube includes a fluid conveying passageway, which includes a wall bounded by a liner;
at least one magnetic field generator configured to generate a magnetic field in the medium extending essentially perpendicularly to the longitudinal direction, wherein the at least one magnetic field generator includes a pole shoe or a saddle coil, and wherein, in the second cross-sectional area of the measuring tube, the pole shoe or the saddle coil subtends the fluid conveying passageway with a maximum central angle; and
an electrode system including at least two electrode pairs, which are adapted to register a voltage induced perpendicularly to the magnetic field and to the longitudinal direction between the electrode pairs, wherein:
a first electrode of each electrode pair is disposed on the first side of the measuring tube;
a second electrode of each electrode pair is disposed on the second side of the measuring tube;
a central angle in the second cross-sectional area of the measuring tube defines a minimum circular sector in which electrodes of the at least two electrode pairs that are disposed on a same side of the measuring tube are distributed; and
the at least two electrode pairs are arranged in the middle segment,
wherein the central angle and the maximum central angle are configured relative to each other such that the flow meter is to a degree insensitive to departures from a rotationally symmetric flow such that the flow meter in a test measurement has a measurement error of flow velocity defined by $$\Delta_u = \left| \frac{u_{va} - u_S}{u_{va}} \right|$$

and/or a measurement error of volume flow rate defined by $$\Delta_{\dot{V}} = \left| \frac{\dot{V}_{va} - \dot{V}_S}{\dot{V}_{va}} \right|$$

less than 1.0%, wherein:
$u_{va}$ and $u_S$ are flow velocities, and $\dot{V}_{va}$ and $\dot{V}_S$ are volume flow rates of the medium;
the flow velocity $u_{va}$ and the volume flow rate $\dot{V}_{va}$ form reference values; and
the flow velocity $u_S$ and/or the volume flow rate $\dot{V}_S$ are determined in the case of a rotationally unsymmetric flow.

2. The flow meter of claim 1, further comprising at least one disturbance source disposed at the inlet side end plane and configured to produce the rotationally unsymmetric flow for the test measurement.

3. The flow meter of claim 2, wherein the at least one disturbance source comprises a diaphragm or a 90° elbow, wherein:
50% of the cross-sectional area of the measuring tube is covered by the diaphragm;
the diaphragm has a chord, which limits the diaphragm toward the tube;
the diaphragm is disposed in a first diaphragm orientation or a second diaphragm orientation;

in the first diaphragm orientation, the chord is oriented perpendicular to the magnetic field, and in the second diaphragm orientation, the chord is oriented parallel with the magnetic field;

the 90° elbow assumes a first elbow orientation or a second elbow orientation;

the first elbow orientation is defined by a pipe axis extending perpendicular to the magnetic field and to the longitudinal direction of the measuring tube, and the second elbow orientation is defined by the pipe axis extending parallel with the magnetic field and perpendicular to the longitudinal direction of the measuring tube.

4. The flow meter of claim 2, wherein the at least one disturbance source is provided with separation 0-DN at the inlet side end plane.

5. The flow meter of claim 1, wherein an insensitivity to a rotationally unsymmetric flow profile is enabled at a Reynolds number of the medium in the measuring tube greater than or equal to 100,000.

6. The flow meter of claim 1, wherein an insensitivity to a rotationally unsymmetric flow profile is enabled at a Reynolds number of the medium in the measuring tube greater than or equal to 10,000.

7. The flow meter of claim 1, wherein the at least two electrode pairs of the flow meter include precisely two or three electrode pairs.

8. The flow meter of claim 1, wherein the at least two electrodes of the at least two electrode pairs disposed, in each case, on one side of the measuring tube relative to the vertical measuring tube longitudinal plane are connected electrically.

9. The flow meter of claim 1, wherein the central angle is greater than or equal to 30° and less than or equal to 60°.

10. The flow meter of claim 1, wherein the maximum central angle is greater than or equal to 50° and less than or equal to 90°.

11. The flow meter of claim 1, wherein the electrodes of the at least two electrode pairs are arranged axisymmetrically to the vertical measuring tube longitudinal plane.

12. The flow meter of claim 1, wherein two neighboring electrodes of the at least two electrode pairs disposed on one side of the measuring tube are spaced by a near central angle defined by $\delta=\alpha/(N-1)$ in the cross-sectional area of the measuring tube, wherein N is a natural number corresponds to the number of electrode pairs, and a is the central angle.

13. A measuring point for determining a flow profile independent flow velocity or volume flow rate of a medium, the measuring point comprising:

a magnetic-inductive flow meter for measuring flow velocity or volume flow rate of the medium, the flow meter comprising:

a measuring tube configured to convey the medium in a longitudinal direction defined by a measuring tube axis, wherein the measuring tube has an inlet side end plane and an outlet side end plane, which bound the measuring tube in the longitudinal direction, wherein the measuring tube includes a passageway, which includes a wall bounded by a liner;

at least one magnetic field generator configured to generate a magnetic field in the medium extending essentially perpendicular to the longitudinal direction, wherein the magnetic field generator includes a pole shoe or a saddle coil, and wherein the pole shoe or the saddle coil in a cross-sectional area of the measuring tube subtends the measuring tube or the passageway with a maximum central angle; and an electrode system including at least two electrode pairs, each configured to detect a voltage induced in the medium perpendicular to the magnetic field and to the longitudinal direction, wherein:

a vertical measuring tube longitudinal plane divides the measuring tube into a first side and a second side;

in each case, a first electrode of an electrode pair of the at least two electrode pairs is disposed on the first side of the measuring tube;

in each case, a second electrode of the electrode pair is disposed on the second side; and a central angle in the cross-sectional area of the measuring tube defines a minimum circular sector in which each electrode disposed on either the first or second side of the measuring tube are distributed, wherein the central angle and the maximum central angle are configured relative to each other such that the flow meter is insensitive to departures from a rotationally symmetric flow of the medium because of a disturbance source applied with a separation of 0-DN at the inlet side end plane, and wherein the flow meter has a measurement error of flow velocity defined by $$\Delta_u = \left| \frac{u_{va} - u_S}{u_{va}} \right|$$

and/or a measurement error of volume flow rate defined by $$\Delta_{\dot{V}} = \left| \frac{\dot{V}_{va} - \dot{V}_S}{\dot{V}_{va}} \right|$$

less than 1.0%, wherein:

$u_{va}$ and $u_S$ are flow velocities, and $\dot{V}_{va}$ and $\dot{V}_S$ are volume flow rates of the medium;

the flow velocity $u_{va}$ and the volume flow rate $\dot{V}_{va}$ are determined in the case of a flow of the medium with fully developed flow profile; and the flow velocity $u_S$ and/or the volume flow rate $\dot{V}_S$ are determined in the case of the applied disturbance source.

14. The measuring point of claim 13, wherein the wherein the central angle is greater than or equal to 30° and less than or equal to 60°, and wherein the maximum central angle is greater than or equal to 50° and less than or equal to 90°.

15. The measuring point of claim 13, wherein the at least two electrode pairs of the flow meter of the measuring point include precisely two or three electrode pairs.

16. The measuring point of claim 13, wherein at least two electrodes of the at least two electrode pairs disposed on a side of the measuring tube relative to the vertical measuring tube longitudinal plane are connected electrically.

17. The measuring point of claim 16, wherein the at least two electrodes are connected electrically by a stamped-bent part.

18. The measuring point of claim 13, wherein the measuring tube includes first and second cross-sectional areas, wherein the measuring tube includes, between the inlet side and outlet side end planes, a middle segment, which includes the second cross-sectional area, and wherein the at least two electrode pairs are disposed in the middle segment.

19. The measuring point of claim 13, wherein the disturbance source comprises a 90° elbow and/or a diaphragm and/or a valve and/or a pump and/or a T-piece and/or a double arch of two 90° elbows set one after the other.

* * * * *